March 8, 1966     J. E. SMITH     3,238,993

FLUID FLOW CONTROL DEVICE

Filed Sept. 25, 1963

JOHN E. SMITH
INVENTOR.

BY
*Walter Patoroka, Jr.*
ATTORNEY

United States Patent Office 3,238,993
Patented Mar. 8, 1966

3,238,993
FLUID FLOW CONTROL DEVICE
John E. Smith, Rochester, Mich., assignor to Holley Carburetor Company, Warren, Mich., a corporation of Michigan
Filed Sept. 25, 1963, Ser. No. 311,585
15 Claims. (Cl. 158—36.4)

This invention relates generally to fluid flow control devices, and more particularly to means for automatically controlling the supply of starting fuel for a gas turbine engine.

As is well known in the art, gas turbine engines must be started by cranking so as to cause the compressor to supply combustion air to the main burner chamber. At some time during cranking, fuel must be supplied to the burners and the ignition system must be actuated to ignite the fuel-air mixture, after which the engine becomes self-sustaining. To insure proper starting, most engines include a separate igniter fuel system which, in conjunction with the ignition system, produces a more easily controlled smaller flame that in turn ignites the main burners.

In some engines, fuel supplied by the main fuel control may remain in the burner section from the previous run, and it may be desirable to exhaust this remaining fuel from the engine before restarting so as to avoid an explosion. Also, it is usually desirable to delay the supply of igniter and main fuel until cranking speed has reached some predetermined percentage of maximum engine speed so that sufficient combustion air is being supplied to provide a proper starting fuel-air mixture. Thus, in starting most gas turbine engines, some predetermined cranking speed is attained before the igniter fuel is supplied and the ignition system is actuated. Also it may be desirable to cut off the igniter fuel after the engine has started and to prevent its being supplied when the engine is shut down.

In gas turbine engines having a slower starting time, supplying igniter fuel and actuation of the ignition system can be accomplished manually by the pilot or operator; however, where the starting time is relatively short, manual control is difficult or impossible, and an automatic system is preferable.

Automatic igniter fuel systems have been used in the past in conjunction with main fuel controls for gas turbine engines. However, systems that function in response to a fuel pressure differential indicative of engine speed have been found to function inefficiently, particularly when the differential pressure is relatively small, as it may be when the cranking speed at which igniter fuel is to be supplied is low, say 10% of maximum engine speed.

Accordingly, a general object of the invention is to provide an improved igniter fuel supply means for gas turbine engines.

More specifically, it is an object of the invention to provide such means wherein a pressure differential responsive servo valve actuates a slave igniter fuel valve to supply igniter fuel to the engine upon attainment during cranking of some predetermined percentage of maximum engine speed.

Another object of the invention is to provide such a servo valve arrangement that will provide a flow of fuel to both the main burner and the igniter sections at a preselected percentage of engine speed and then stop fuel flow to the igniter, while allowing fuel flow to the main burner to continue, at some predetermined higher engine speed.

Still another object of this invention is to provide a servo igniter fuel valve which separates the functions of sensing engine speed and controlling igniter fuel flow in response to the sensed speed.

A specific object of the invention is to incorporate the servo and slave valves in the igniter fuel system in such a manner that the latter is not directly subjected to speed sense pressure differential. In other words, the flow of fuel which is indicative of speed is communicated to other elements of the system which are completely removed from the speed sensing servo valve.

A further object of the invention is to provide a servo igniter fuel valve which may be incorporated either in a typical main fuel control as a component part thereof or in association with the main fuel control as a separate unit.

Other more specific objects and advantages of the invention will become apparent when reference is made to the following description and accompanying illustration wherein.

Figure 1:
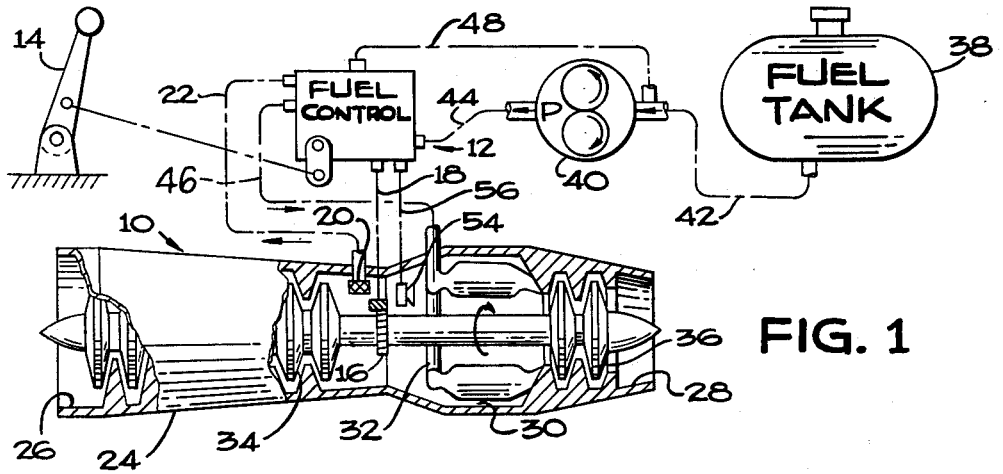
FIGURE 1 is a schematic illustration of a gas turbine engine having connected thereto fuel supply and fuel control systems, including an igniter fuel system embodying the invention.

Referring now to the drawings in greater detail, FIGURE 1 illustrates schematically a gas turbine engine 10 having a typical main fuel control 12 responsive to manual control by means of a selector lever 14, to engine speed by means of a gear box 16 and transmission line 18, and to other parameters such as compressor discharge pressure, for example, via a pressure probe 20 and conduit 22.

A typical gas turbine engine 10 includes an outer housing 24 with an intake 26 and exhaust nozzle 28. A main combustion chamber 30 having a fuel distribution ring 32 therein is located within the housing 24 between the compressor 34 and the turbine 36. The fuel supply system generally comprises a fuel tank 38, an engine driven pump 40 that may be included as a component of the main fuel control 12, and supply conduits 42 and 44 for delivering fuel to the fuel control 12. As is well known in the art, the fuel control 12 meters the correct fuel flow for the particular engine operating requirements, as dictated by the above mentioned parameters. Correctly metered fuel is transferred to the fuel distribution ring 32 in the burner chamber via a conduit 46, any excess fuel being bypassed back to the inlet side of the pump via a return conduit 48.

Figure 2:
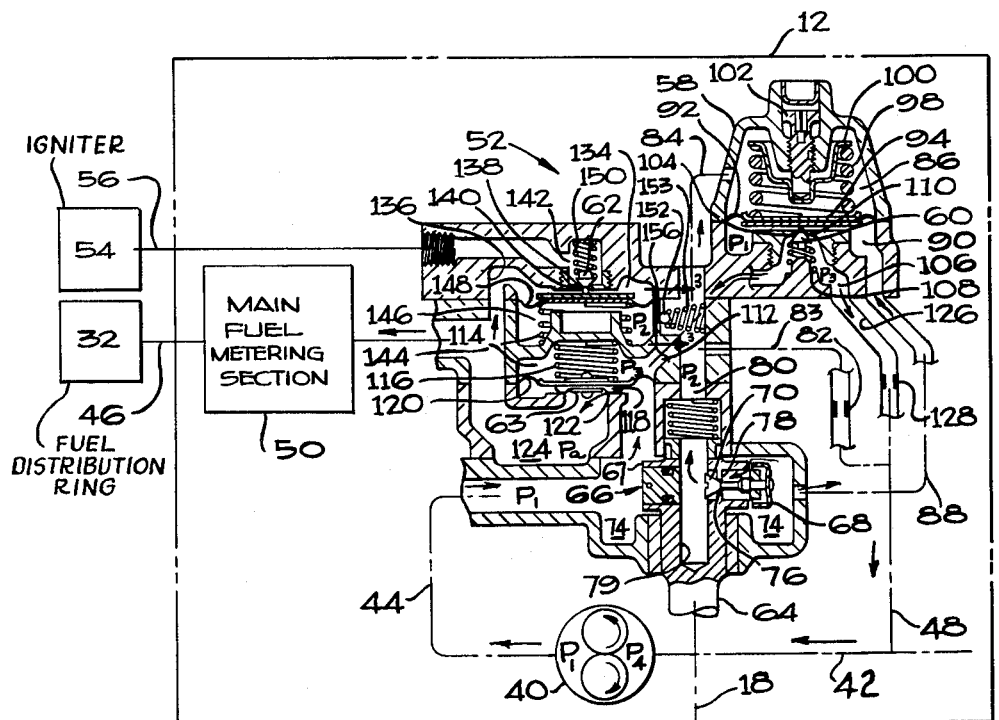
FIGURE 2 is an enlarged schematic illustration of the igniter fuel control portion of FIGURE 1.

As seen in FIGURE 2, in addition to the main fuel metering section 50, the fuel control 12 further includes means 52 for furnishing fuel to the igniter 54 of the engine 10 via a conduit 56, at engine speeds preselected for a particular engine. For example, in a particular engine, it may be desired to supply igniter fuel when cranking speed reaches 10% of maximum speed and to cut off this fuel when the engine has started and is operating at 40% of maximum speed.

More specifically, the means 52 for furnishing igniter fuel comprises a housing 58 containing a servo valve 60, an igniter valve 62, a slave valve 63 and a shaft 64 journalled for rotation in the housing. It is to be understood that, while the means 52 is illustrated and described herein as being an integral part of a main fuel control 12 enclosed by the dot-dash line of FIGURE 2, such a means 52 may alternatively be added to the fuel supply system by properly connecting the same either upstream or downstream of the main fuel control 12.

The hollow shaft 64 may be rotated by means of the transmission line 18 which is connected to the gear box 16 driven by the engine. A typical centrifugal speed sense 66 rotatable with the shaft 64 includes a cross member 67 which is formed to provide an orifice 76 defined by a seat 78 and which contains a valve 70, the latter being urged by $P_1$ pressure toward a full open position that is limited by the member 68. Thus, fuel under pressure $P_1$, which is a constant pump output pressure, flows from the chamber 74 through the orifice 76 controlled by the valve 70, into the axial passage 79 in the shaft 64 and upwardly into chamber 80. A pressure drop occurs across the orifice 76, and the fuel in the chamber 80 is at a somewhat lower pressure, $P_2$. This intermediate pressure, $P_2$, is maintained by virtue of the fixed restriction 82 in the passage 83 communicating between the chamber 80 and any convenient passage (such as conduit 48) leading back to the inlet side of the pump 40.

As the speed of rotation of the shaft 64 increases, the centrifugal force urging the valve 70 closed against seat 78 also increases, thereby restricting the flow of fuel through the orifice 76. Accordingly, it can be seen that the differential pressure, $P_1-P_2$, increases as engine speed increases, the differential varying directly as the square of the engine speed. It is to be understood that various other techniques may be employed to sense engine speed and to provide a pressure signal in accord therewith.

Fuel under pressure $P_2$ is then communicated via a passageway 84 to the chamber 86, while fuel under pressure $P_1$ is communicated via a passageway 88 to a chamber 90. A diaphragm 92, including the usual washers 94, forms a movable wall between the chambers 86 and 90; the diaphragm 92 thus senses the pressure differential, $P_1-P_2$, which is indicative of engine speed, as mentioned above.

A spring 98 is confined between the upper washer 94 and a spring retainer 100 mounted in the chamber 86, the spring retainer 100 being axially adjustable therein by means of an adjustment screw 102. A servo valve 60 and a valve seat 104 are located between the chamber 90 and another chamber 106, the valve 60 being urged against the seat 104 by means of a spring 108. When the force of the spring 98 on the diaphragm 92 exceeds the opposing forces exerted by the $P_1-P_2$ pressure differential acting on diaphargm 92 and spring 108, valve 60 opens, permitting fuel under pressure $P_1$ to flow through the orifice 110 and into the chamber 106, the pressure $P_3$, in chamber 106 being slightly less than pressure $P_1$ due to the pressure drop across the orifice 110. Fuel is then communicated via a passageway 112 from the chamber 106 to a chamber 114, wherein $P_3$ pressure and spring 116 urge the valve 63, which may have a resilient seal ring 118 affixed thereto and which is attached to the diaphragm 120, closed against a seat 122. While the valve 63 is closed, the pressure in the chamber 124 adjacent thereto is essentially atmospheric, hereinafter referred to as $P_a$.

Valve 63 will be closed so long as the speed of rotation of the shaft 64 is less than the above mentioned 10% of maximum engine speed. However, once this 10% speed has been exceeded, pressure $P_2$ in chambers 80 and 86 will have decreased, permitting the pressure $P_1$ in the chamber 90 to raise the diaphragm 92 from the valve 60 against the force of the spring 98. This allows the spring 108 to close the valve 60 against the seat 104 in opposition to the pressure differential $P_1-P_3$, thereby blocking off the flow from the chamber 90 to the chamber 106.

As soon as flow into the chamber 106 stops, pressure $P_3$ decreases to approximately the value of pump return pressure, $P_4$, by virtue of the flow through a passageway 126 and the restriction 128 from the chamber 106 to the inlet of the pump 40 via the passageway 48. It is evident that when pressure $P_3$ diminshes a predetermined amount, $P_1$, which acts only on the outer portion of the diaphragm 120, will overcome the spring 116 and raise the valve 63, admitting $P_1$ fuel to chamber 124. The fuel displaced from the chamber 114 merely flows to the chamber 106 via the passageway 112, and thence to the pump return conduit 48 via the passageway 126 and the restriction 128.

Before valve 63 opens, the pressure in chamber 124 is substantially atmospheric, as previously stated. The $P_2-P_a$ pressure differential and the force of spring 144 acting on diaphragm 148 maintain the valve 62 open against the force of the spring 150 tending to close it. When valve 63 opens, fuel under pressure $P_1$ will also be admitted to the chamber 134 via the passage 136. Since the valve 62 is raised from its seat 140, the fuel will flow from the chamber 134, through the orifice 138, into chamber 142 and thence to the igniter 54 through the conduit 56. The force of the spring 144 in chamber 146 is sufficient to resist any downward movement of the diaphragm 148 until such time as the pressure differential $P_1-P_2$ is indicative of an engine speed at which it is desired to cut off the igniter fuel, 40% of maximum engine speed, for example. When $P_2$ has dropped to the above value due to increasing engine speed, $P_1$ acting on the diaphragm 148 will force it downwardly against the force of the spring 144, permitting spring 150 to close valve 62. This, of course, cuts off the flow of fuel to igniter 54.

Figure 3:
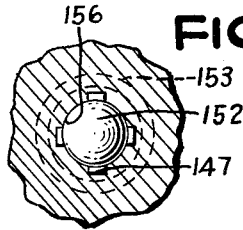
FIGURE 3 is an enlarged fragmentary cross-sectional view taken along the plane of line 3—3 of FIGURE 2, as if FIGURE 2 were a full round structure, and looking in the direction of the arrows.

It should be mentioned at this point that communication of $P_2$ pressure to chamber 146 is through the orifice 156 controlled by the ball check valve 152. Spring 153 is a very light spring used only to locate the ball at the orifice 156; thus, flow from chamber 146 to chamber 80 is freely permitted, and any drop in $P_2$ in chamber 80 immediately results in a similar drop in $P_2$ in chamber 146. However, the seat for ball 152 is constructed so that leakage past the ball and into chamber 146 is permitted (such as through slots 147 formed in the wall of the orifice 156, as illustrated in FIGURE 3) when $P_2$ in chamber 80 increases, as would occur on decreasing engine speed. The rate of leakage permitted is such that the increased pressure in chamber 80 is not communicated to chamber 146 to the extent that valve 62 is reopened by diaphragm 148 until after valve 60 has opened, as will be explained.

It is apparent that the engine speeds at which the above described igniter action takes place may be varied from the example of 10 to 40 percent of maximum engine speed. Actually, any speed values can be predetermined for specific engine requirements, merely by varying the design details, such as spring forces, diaphragm diameters, etc.

It will be noted that in the arrangement shown by FIGURE 2, the device controlling the supply of fuel to the igniter also controls the flow of fuel to the main fuel metering device. In other words, in this arrangement the engine would be cranked, during which time any residual fuel would be exhausted from the engine, and when cranking resulted in engine shaft speed approximately 10% of the maximum engine speed, fuel would be supplied both to the igniter and to the metering section of the main fuel control. The ignition system would be actuated at this time, and the igniter would produce a smaller flame that ignites the main burners. Main fuel and igniter fuel would continue to be supplied after the engine started and became self-sustaining until its speed reached approximately 40% of maximum, at which time the igniter fuel would be shut off but the main fuel would continue to be supplied. Igniter fuel is not supplied during the 40% to 10% speed range on shut down of the engine as it was in the 10% to 40% range when the engine was started, and the main fuel is cut off when engine speed drops to 10%.

From the above discussion, it is apparent that the invention provides a compact and efficient igniter fuel device having a number of novel features that result in accurate sequencing of fuel flow to the main burners and the igniter of a gas turbine engine. Also, the servo starting device may be incorporated in series with the main fuel control unit, either downstream or upstream thereof, as well as in the fuel control housing itself as an integral part thereof.

It should also be apparent that the invention provides a valve means for controlling the sequencing of the fuel flow which is divorced from the valve means which is actuated by the speed responsive pressure differential, thereby resulting in greater accuracy and reliability.

The use of the device disclosed herein is not limited to aircraft type gas turbine engines, or even to the control of gas turbine engines generally. For example, the device may be employed in any installation in which it is desired to control fluid flow in accordance with changes in some parameter reflected in variations in an input pressure, as might be the case in some stationary chemical processing installation.

Although but one embodiment of the invention has been disclosed and discussed, it is obvious that other modifications of the invention are possible within the scope of the appended claims.

What I claim as my invention is:

1. A device for controlling the flow of fluid from a constant pressure source to separate first and second points in a fluid consuming mechanism having an operating parameter, said device comprising a main conduit extending from said constant pressure source and branching into separate conduits leading to said first and second points, means for continuously sensing said parameter and causing a pressure varying from said constant pressure in accordance with said sensed parameter, serve valve means responsive to the pressure differential between said constant pressure and said varible pressure for providing a pressure signal indicative of said parameter, means in said main conduit responsive to said pressure signal for controlling the flow of said constant pressure fluid through said main conduit at some preselected range of said parameter and means in one of said branch conduits responsive to said pressure signal for preventing fluid flow through said one branch conduit during some other preselected range of said parameter.

2. In a fuel system for a gas turbine engine having a main burner and an igniter for said burner, the system including a fuel reservoir, a fuel metering device for supplying fuel to said main burner, a constant pressure pump for supplying fuel from said reservoir to said metering device and to said igniter and suitable conduits between said tank and said burner and igniter, a device for automatically controlling igniter and main fuel supply in accordance with engine speed, said device comprising means for continuously sensing engine speed and causing a corresponding variable pressure, servo valve means for converting said variable pressure to a pressure signal, slave valve means for permitting constant pressure fuel flow to said igniter and said main burner in response to said pressure signal, separate slave valve means for preventing fuel flow to said igniter during some different range of said variable pressure, and means for preventing flow of fuel to said igniter until after said pressure signal is eliminated by said servo valve means when said engine is coasting down from idle speed.

3. In a gas turbine engine fuel control including an engine speed sensing means, a main passage from a constant pressure fuel supply source, a first branch passage to the igniter section of said gas turbine engine and a second branch passage to the burner section of said engine, a starting fuel system, said system comprising means for permitting simultaneous fuel flow from said main passage through said first and second passages at a predetermined lower engine speed and additional means operatively connected to a portion of said first means for stopping fuel flow through said first passage at some predetermined higher engine speed.

4. In a gas turbine engine fuel control including an engine speed sensing means, an inlet from a constant pressure fuel supply source, a first outlet to a fuel return line, a second outlet to the igniter section of said gas turbine engine and a third outlet to the burner section of said engine, a starting fuel system, said system comprising servo means, slave means and additional means, all operatively connected for simultaneously permitting fuel flow to said burner and igniter sections at a low predetermined engine speed and for stopping fuel flow to said igniter section at some higher predetermined engine speed in response to changes in pressure differential across said speed sensing means.

5. Apparatus for sequentially starting and stopping the flow of fuel to the igniter section of a gas turbine engine, said apparatus comprising a source of pressure, a servo valve, first pressure responsive means adjacent said servo valve for actuating said servo valve upon attainment of some predetermined pressure differential, a slave valve, first means of communication between said source of pressure and said servo and slave valves for opening said salve valve when said servo valve closes and closing said slave valve when said servo valve opens, an igniter fuel valve, second pressure responsive means adjacent said igniter fuel valve, and second means of communcation between said source of pressure and said second pressure responsive means for actuating said igniter fuel valve upon attainment of some higher predetermined pressure differential across said second pressure responsive means.

6. Apparatus for starting the flow of fuel to the burner section of a gas turbine engine and for sequentially starting and stopping the flow of fuel to the igniter section thereof, said apparatus comprising a source of pressure, three pairs of chambers, each pair of chambers having a pressure responsive means forming a movable wall therebetween, valve means in one of each of said three pairs of chambers, each of said three valve means being actuated by one of said pressure responsive means, first communication means between said source of pressure and two of said three pressure responsive means for causing two of said valve means to open and close alternatively upon attainment of some predetermined pressure differential across one of said two pressure responsive means and second communication means between said source of pressure and said third pressure responsive means for causing the third of said valve means to close upon attainment of some higher predetermined pressure different across said third pressure responsive means.

7. In a gas turbine engine fuel control including an inlet from a constant pressure fuel supply source, a speed sensing means for producing a hydraulic pressure, the differential between said last mentioned pressure and said source pressure being indicative of engine speed, a first passage leading to the burner section of said engine and a second passage leading to the igniter section of said engine, a starting fuel device, said device comprising a servo valve arranged to close in response to a first predetermined pressure differential, a slave valve for allowing communication between said inlet and said pair of passages upon the closing of said servo means, and an igniter fuel valve arranged to block off flow through said second passage in response to a predetermined higher pressure differential.

8. In a gas turbine engine fuel control including an inlet from a constant pressure fuel supply source, a speed sensing means for producing a hydraulic pressure, the differential between said last mentioned pressure and said source pressure being indicative of engine speed, a first passage leading to the burner section of said engine and a second passage leading to the igniter section of said engine, a starting fuel device, said device comprising a servo valve arranged to close in response to a first predetermined pressure differential, a slave valve for allowing communication between said inlet and said pair of passages upon the closing of said servo means, and an igniter fuel valve arranged to block off flow through said second passage in response to a predetermined higher pressure differential and to remain closed until said first predetermined pressure differential is once again attained.

9. In a gas turbine engine fuel control including an inlet from a constant pressure fuel supply source, a hydraulic speed sensing means for controlling fuel flow from said inlet to a chamber downstream thereof, a first outlet to the burner section of said engine, a first passageway communicating between said outlet and the igniter section of said engine and a spring-loaded igniter valve in said first passageway for at times shutting off the flow therethrough, a starting fuel system, said system comprising first and second chambers, a first diaphragm forming a movable wall between said first and second chambers, a third chamber having a spring-loaded servo valve therein for controlling communication between said second and third chambers, said servo valve at times being in contact with said first diaphragm, a second passageway communicating between said downstream chamber and said first chamber, a third passageway communicating between said inlet and said second chamber, fourth and fifth chambers, a second diaphragm forming a movable wall between said fourth and fifth chambers, a fourth passageway communicating between said inlet and said fourth chamber, said second diaphragm at times permitting communication between said fourth chamber and said outlet, a fifth passageway communicating between said third chamber and said fifth chamber, a sixth passageway having a fixed restriction therein communicating between said third chamber and the inlet side of said fuel supply source, a sixth chamber, a third diaphragm forming a movable wall between said sixth chamber and said first passageway and at times being in contact with said igniter valve, a seventh passageway at times communicating between said sixth chamber and said downstream chamber and a spring-loaded check valve in said seventh passageway.

10. In a gas turbine engine fuel control, said fuel control including an inlet from a constant pressure fuel supply source, a hydraulic speed sensing means for controlling fuel flow from said inlet to a chamber downstream thereof, a first passage at times communicating between said inlet and the burner section of said engine, a second passage communicating between said first passage and the igniter section of said engine and a spring-loaded igniter valve in said second passage for at times shutting off the flow therethrough, a starting fuel system, said system comprising first and second chambers, a first diaphragm forming a movable wall between said first and second chambers, a third chamber having a spring-loaded servo valve therein for controlling communication between said second and third chambers, said servo valve at times being in contact with said first diaphragm, a third passage communicating between said downstream chamber and said first chamber, a fourth passage communicating between said inlet and said second chamber, a fourth chamber, a second diaphragm forming a movable wall between said fourth chamber and said first passage, said second diaphragm serving as a valve for controlling flow through said first passage, a fifth passage communicating between said third chamber and said fourth chamber, a sixth passage having a fixed restriction therein communicating between said third chamber and said fuel supply source, a fifth chamber, a third diaphragm forming a movable wall between said fifth chamber and said second passage and at times being in contact with said igniter valve, a seventh passage at times communicating between said fifth chamber and said downstream chamber and a spring-loaded check valve in said seventh passage for permitting leakage from said fifth chamber to said downstream chamber.

11. A device for controlling the flow of fluid from a pressure source to separate first and second points in a fluid consuming mechanism having an operating parameter, said device comprising a main conduit extending from said pressure source and branching into separate conduits leading to said first and second points, means for continuously sensing said parameter and causing a pressure varying from the pressure from said pressure source in accordance with said sensed parameter, means responsive to the pressure differential between said pressure and said variable pressure for providing a pressure signal indicative of said parameter, means adjacent said main conduit responsive to said pressure signal for controlling the flow of fluid from said pressure source through said main conduit at some preselected range of said parameter and means adjacent one of said branch conduits responsive to said pressure signal for preventing fluid flow through said one branch conduit during some other preselected range of said parameter.

12. A device for controlling the flow of fluid from a pressure source to two separate points in a fluid consuming mechanism having an operating parameter, said device comprising means for continuously sensing said parameter and causing a pressure varying from the pressure from said pressure source in accordance with said sensed parameter, servo means movable in response to said varying pressure, slave means movable in response to movement of said servo means for permitting fluid flow to said two separate points, and additional means responsive to a predetermined change in said varying pressure for preventing fluid flow to one of two separate points during some preselected pressure range.

13. A device for controlling the flow of fluid from a pressure source to two separate points in a fluid consuming mechanism having an operating parameter, said device comprising means for continuously sensing said parameter and causing a pressure varying from the pressure from said pressure source in accordance with said sensed parameter, servo means movable in response to said varying pressure, slave means movable in response to a decrease in pressure from said source pressure to low return pressure resulting from the movement of said servo means at some predetermined value of said varying pressure for permitting fluid flow to said two separate points, and additional means responsive to a predetermined change in said varying pressure for preventing fluid flow to one of two separate points during some preselected pressure range.

14. In a fuel system for a gas turbine engine having a main burner, the system including a fuel reservoir, a fuel metering device for supplying fuel to said main burner, a pump for supplying fuel from said reservoir to said metering device and suitable conduits between said tank and said burner, a device for automatically controlling the main fuel supply in accordance with engine speed, said device comprising means for continuously sensing engine speed and causing a pressure varying from the pressure of fuel supplied by said pump, servo valve means responsive to the pressure differential between said pressure of said pumped fluid and said variable pressure for providing a pressure signal indicative of said parameter, and slave valve means adjacent said conduit to said burner for permitting fuel flow from said pump to said main burner during some preselected range of said pressure signal.

15. In a fuel system for a gas turbine engine having a main burner and an igniter for said burner, the system including a fuel reservoir, a pump for supplying fuel from said reservoir to said metering device and to said igniter and suitable conduits between said tank and said igniter, a device for automatically controlling igniter fuel supply in accordance with engine speed, said device comprising means for continuously sensing engine speed and causing a pressure varying from the pressure of fuel supplied by said pump, servo valve means responsive to the pressure differential between said pressure of said pumped fluid and said variable pressure for providing a pressure signal indicative of said parameter, slave valve means for permitting fuel flow from said pump to said igniter during some preselected range of said pressure signal, separate slave valve means for preventing fuel flow to said igniter during some different range of said pressure signal, and means for preventing flow of fuel to said igniter even in said preselected range of said pressure signal when said engine is coasting down from idle speed.

References Cited by the Examiner

UNITED STATES PATENTS

| | | | |
|---|---|---|---|
| 2,498,939 | 2/1950 | Bobier | 60—36.6 |
| 2,836,957 | 6/1958 | Fox | 60—39.28 |
| 2,916,876 | 12/1959 | Colley et al. | 60—35.6 |
| 2,980,174 | 4/1961 | Rogers | 251—29 X |
| 2,980,176 | 4/1961 | Torell | 251—29 X |
| 3,142,154 | 7/1964 | Leeson | 158—36.4 X |

FREDERICK L. MATTESON, JR., *Primary Examiner.*
ROBERT A. DUA, *Examiner.*